(12) United States Patent
Pai et al.

(10) Patent No.: US 11,491,695 B2
(45) Date of Patent: Nov. 8, 2022

(54) FORMING MOLD FOR MAKING POLYVINYL CHLORIDE FOAMED WOOD-LIKE SLATS

(71) Applicant: UNION WINNER INTERNATIONAL CO., LTD., Taipei (TW)

(72) Inventors: Ming-Tsung Pai, Caotun Township (TW); Kun-Chuan Wu, Kaohsiung (TW)

(73) Assignee: UNION WINNER INTERNATIONAL CO., LTD., Taipei (TW)

( * ) Notice: Subject to any disclaimer, the term of this patent is extended or adjusted under 35 U.S.C. 154(b) by 322 days.

(21) Appl. No.: 16/928,911

(22) Filed: Jul. 14, 2020

(65) Prior Publication Data

US 2021/0170660 A1 Jun. 10, 2021

(30) Foreign Application Priority Data

Dec. 10, 2019 (TW) .................................. 108145153
Jun. 18, 2020 (TW) .................................. 109120627

(51) Int. Cl.

| B29C 48/12 | (2019.01) |
| B29C 48/07 | (2019.01) |
| E04F 15/10 | (2006.01) |
| B29C 48/00 | (2019.01) |
| B29K 105/04 | (2006.01) |
| B29K 27/06 | (2006.01) |

(52) U.S. Cl.
CPC ............ B29C 48/12 (2019.02); B29C 48/022 (2019.02); B29C 48/07 (2019.02); E04F 15/10 (2013.01); B29K 2027/06 (2013.01); B29K 2105/04 (2013.01)

(58) Field of Classification Search
CPC ......... B29C 48/07; B29C 48/51; B29C 48/53; B29C 48/68; B29C 31/08; B29C 2043/3433; B29C 44/505; B29C 48/0014; B29C 48/0255; B29C 48/16; B29C 48/345
See application file for complete search history.

(56) References Cited

U.S. PATENT DOCUMENTS 6,491,510 B1 * 12/2002 Tieu ..................... B29C 48/705
425/464

* cited by examiner

*Primary Examiner* — Stella K Yi
(74) *Attorney, Agent, or Firm* — Birch, Stewart, Kolasch & Birch, LLP

(57) ABSTRACT

A forming mold for making polyvinyl chloride foamed wood-like slats includes an inlet, an outlet, and two main flow passages symmetrically arranged with respect to a central axis. The main flow passages each have an inlet section respectively connected to the inlet and an outlet section respectively connected to the outlet. The extension direction of the inlet section of each main flow passage respectively defines with the central axis an included angle therebetween. The sum of the angles of the two included angles ranges from 44.2 to 48.8 degrees. The width of the main flow passages gradually increases from the inlet toward the outlets. The height of the main flow passages gradually reduces from the inlet toward the outlets. In this way, the forming mold of the present invention can effectively improve production efficiency and can increase the stability of the product manufacturing process.

14 Claims, 12 Drawing Sheets

FORMING MOLD FOR MAKING POLYVINYL CHLORIDE FOAMED WOOD-LIKE SLATS

BACKGROUND OF THE INVENTION

1. Field of the Invention

The present invention relates to slat forming technology and more particularly, to a forming mold for making polyvinyl chloride foamed wood-like slats.

2. Description of the Related Art

In the past, curtain slats were mainly made of aluminum or iron flakes after being processed into curved sections, and then painted on the surface. However, such conventional slats have the disadvantages of high raw material costs, heavy weight of the finished product, and easy absorption of heat, resulting in poor thermal insulation effects. In order to improve the above problems, some developers have developed slats made of plastic raw materials such as polyvinyl chloride foam materials to achieve the goals of cost reduction, light weight, and good thermal insulation. However, the forming molds currently used for making PVC foamed slats mainly use a one-in-one-out design, that is, there is only one inlet and one outlet, which will cause the problem of low production efficiency.

SUMMARY OF THE INVENTION

The present invention has been accomplished under the circumstances in view. It is the main object of the present invention to provide a forming mold for making polyvinyl chloride foamed wood-like slats, which can effectively improve production efficiency.

To achieve this and other objects of the present invention, a forming mold for making polyvinyl chloride foamed wood-like slats comprises an inlet, an outlet, and two main flow passages symmetrically arranged with respect to a central axis. The main flow passages each have an inlet section and an outlet section. The inlet section of each main flow passage is connected to the inlet. The extension direction of the inlet section of each main flow passage respectively defines with the central axis a first included angle therebetween. The sum of the angles of the two first included angles ranges from 44.2 to 48.8 degrees. The outlet sections of the main flow passages each have one end respectively connected to one respective outlet. Furthermore, the width of each main flow passage gradually increases from the inlet toward the outlets, and the height of each main flow passage gradually reduces from the inlet toward the outlets.

As can be known from the above, the forming mold of the present invention uses a one-in two-out design and is matched with the symmetrical configuration of the two main flow passages to effectively improve production efficiency and to make the manufactured product have the characteristics of stable quality.

Preferably, the height of the inlet section of each main flow passage is consistent from beginning to end.

Preferably, the width of the outlet section of each main flow passage is consistent from beginning to end, the extending direction of the outlet section of each main flow passage is parallel to the central axis, and the height of the outlet section of each main flow passage is consistent from beginning to end.

Preferably, the two main flow passages each comprise a front connection section connected to the associating inlet section, a rear connection section connected to the associating outlet section, and a middle connection section connected between the front connection section and the rear connection section. The height of the front connection section of each main flow passages gradually reduces from the associating inlet section toward the associating middle connection section, and the width of the front connection sections is consistent from beginning to end. The extension direction of each front connection section respectively defines with the central axis a second included angle therebetween, and the sum of the angles of the two second included angles ranges from 36.9 to 61.9 degrees. The height of the middle connection section of each main flow passages gradually reduces from the associating front connection section toward the associating rear connection section, and the width of the middle connection section of each main flow passage gradually increases from the associating front connection section toward the associating rear connection section. A third included angle is respectively defined between the extension direction of the inner wall of each of the two middle connection sections and the central axis, and the sum of the angles of the two third included angles ranges from 5.7 to 8.6 degrees. A fourth included angle is respectively defined between the extension direction of the outer wall of each of the two middle connection sections and the central axis, and the sum of the angles of the two fourth included angles ranges from 28.1 to 41.1 degrees. The height of the rear connection section of each main flow passages gradually reduces from the associating middle connection section toward the associating outlet section, and the width of the rear connection section of each main flow passages is consistent from beginning to end. With the above technical characteristics, after the polyvinyl chloride foam material is injected into the inlet, the polyvinyl chloride foam material can quickly and stably pass through the main flow passages, and then the shape of the product is formed from the outlet.

Preferably, the forming mold further comprises a sub flow passage and two branch flow passages. The sub flow passage is located between the rear connection sections of the two main flow passages and extends straight down from the top surface of the forming mold. The two branch flow passages each have one end thereof respectively communicating with the rear connection sections of the two main flow passages, and an opposite end thereof commonly communicating with the bottom end of the sub flow passage. With the above technical characteristics, a skin material is injected into the sub flow passage, and then the skin material flows from the sub flow passage through the two branch flow passages to the rear connection sections of the two main flow passages respectively, and the skin material is then mixed with the polyvinyl chloride foam material passing therethrough to form the skin layer of the product.

The detailed structure, characteristics, assembly or use method of the forming mold for making polyvinyl chloride foamed wood-like slats provided by the present invention will be described in the detailed description of the subsequent preferred embodiment. However, those with ordinary skill in the art of the present invention should be able to understand that the detailed descriptions and the specific preferred embodiment listed in the implementation of the present invention are only used to illustrate the present invention and are not intended to limit the scope of the patent application of the present invention.

DETAILED DESCRIPTION OF THE INVENTION

Figure 1:
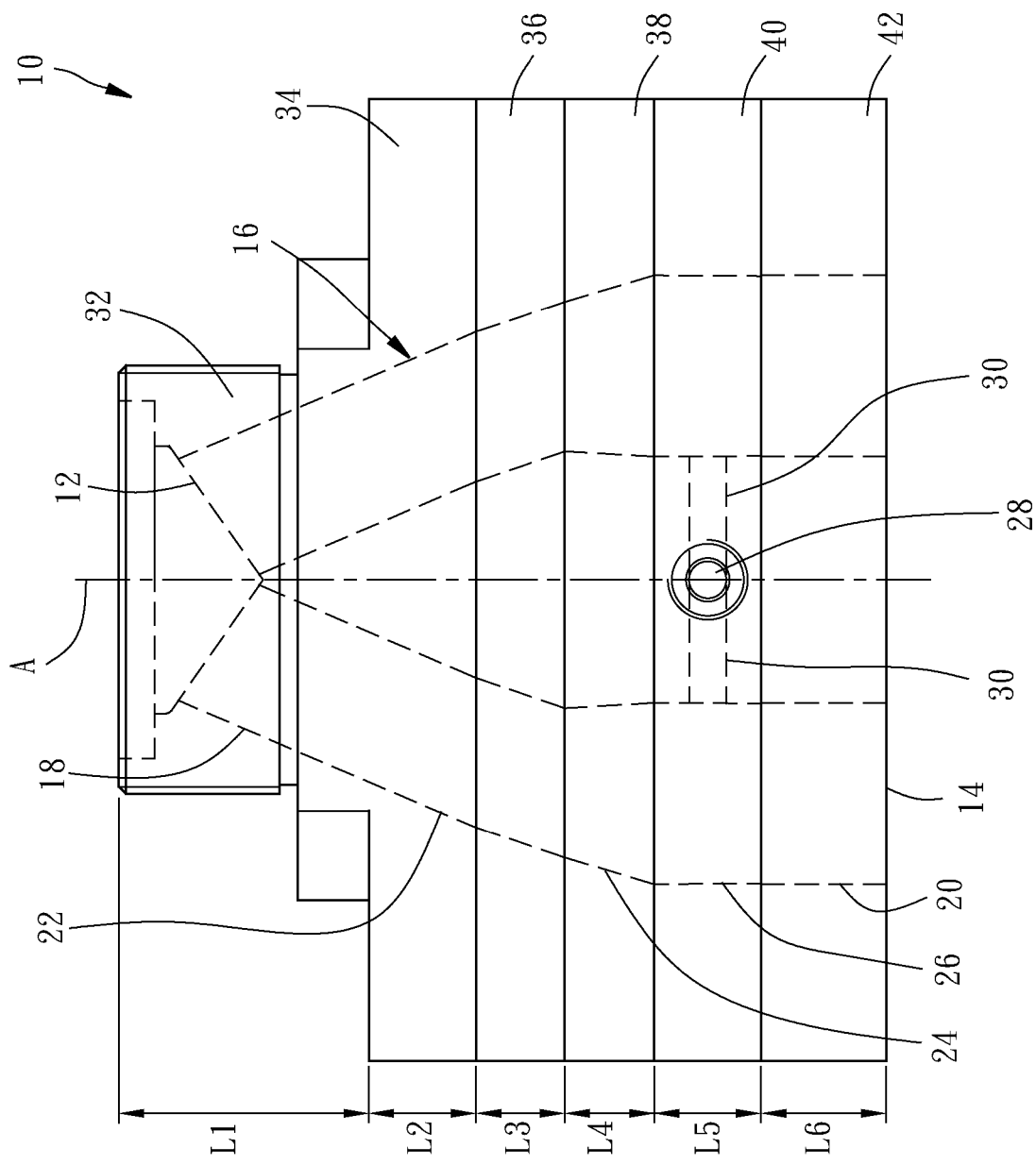
FIG. 1 is a top view of a forming mold for making polyvinyl chloride foamed wood-like slats in accordance with the present invention.

The applicant first explains here, in the entire specification, including the preferred embodiment and the drawings, the terms related to directionality are based on the directions in the drawings. Second, in the embodiment and the drawings to be described below, the same component numbers represent the same or similar components or their structural features.

Figure 2:
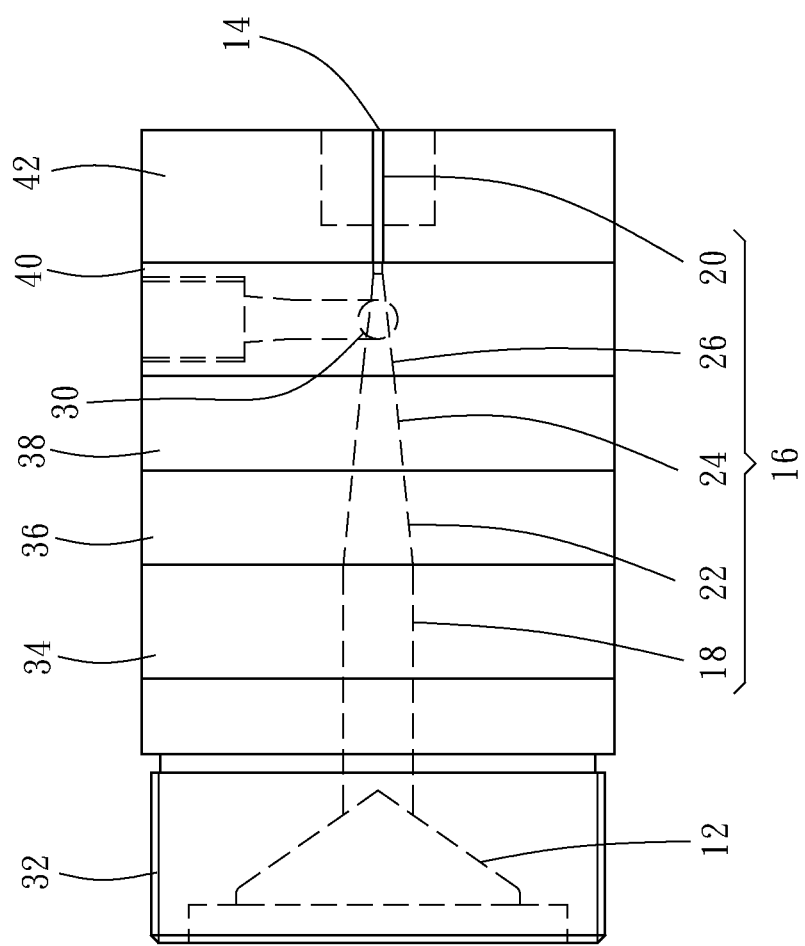
FIG. 2 is a side view of the forming mold for making polyvinyl chloride foamed wood-like slats in accordance with the present invention.
Figure 3:
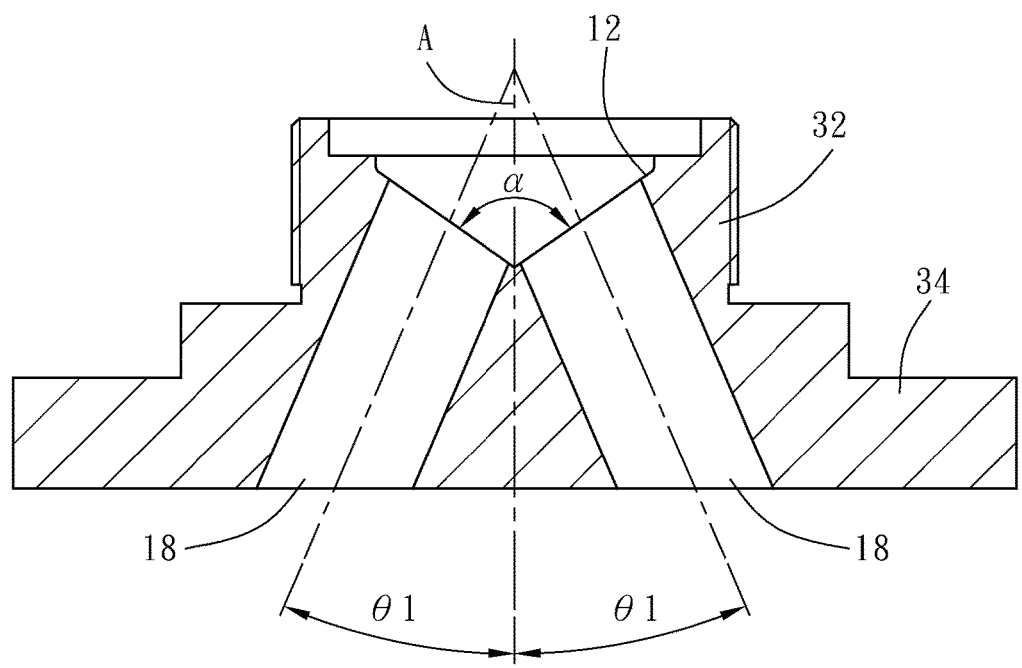
FIG. 3 is a top view of the first die block and the second die block of the forming mold in accordance with the present invention.

Referring to FIG. 1 and FIG. 2, a forming mold 10 has one inlet 12 and two outlets 14, wherein the inlet 12 has an opening angle α between 105 and 115 degrees (see FIG. 3). The forming mold 10 of the present invention further has two main flow passages 16, and the two main flow passages 16 are symmetrically arranged with respect to a central axis A. The height of the two main flow passages 16 gradually decreases from the inlet 12 toward the outlets 14 (see FIG. 2). The width of the two main flow passages 16 gradually increases from the inlet 12 toward the outlets 14 (see FIG. 1).

Figure 4:
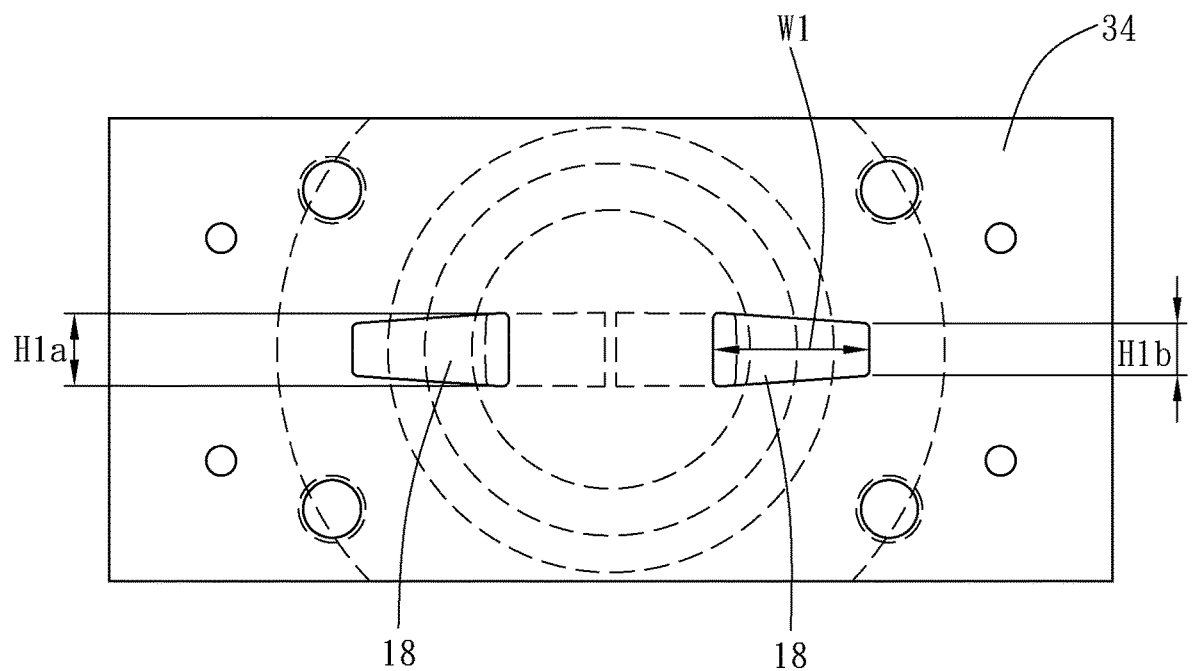
FIG. 4 is an end view of the second die block of the forming mold in accordance with the present invention.
Figure 5:
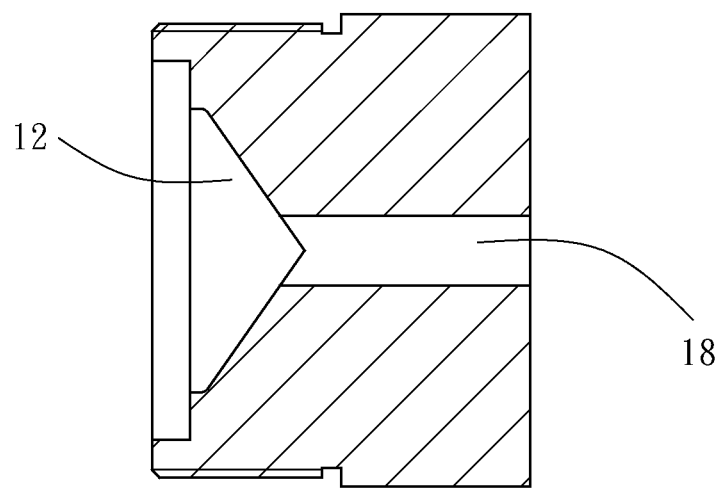
FIG. 5 is a sectional side view of the first die block and the second die block of the forming mold in accordance with the present invention.

Furthermore, the two main flow passages 16 each have an inlet section 18. The inlet sections 18 of the two main flow passages 16 each have one end thereof commonly connected to the inlet 12, as shown in FIG. 4 and FIG. 5. The cross-sectional shape of the two inlet sections 18 is trapezoidal. The height H1a of the inner wall of the two inlet sections 18 is 20 mm, and the height H1b of the outer wall of the two inlet sections 18 is 14.01 mm, both of which are consistent from beginning to end. As for the width W1 of the two inlet sections 18 is also consistent from beginning to end (W1 is 42 mm in this embodiment). In addition, as shown in FIG. 3, the length direction of the two inlet sections 18 and the central axis A respectively have a first included angle θ1, and the sum of the angles of the two first included angles θ1 ranges from 44.2-48.8 degrees (The smallest sum of angles is 44.2 degrees, and the largest sum of angles is 48.8 degrees).

Figure 15:
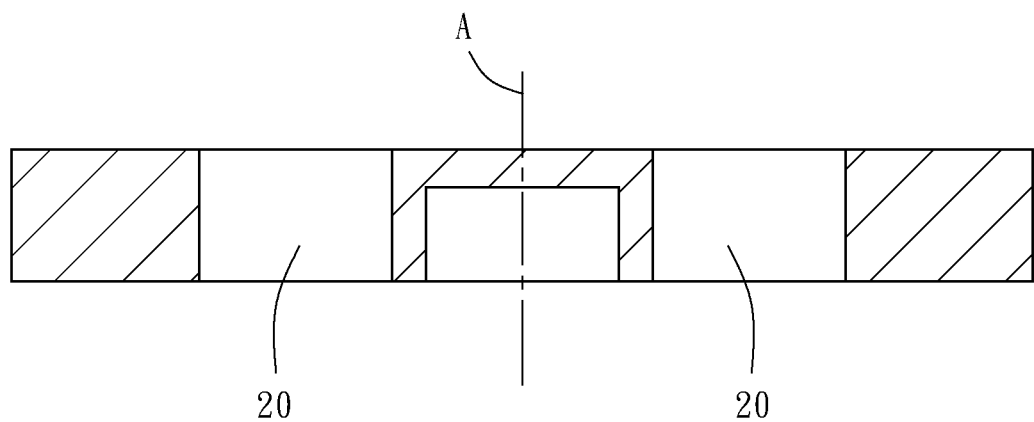
FIG. 15 is a top view of the sixth die block of the forming mold in accordance with the present invention.
Figure 16:
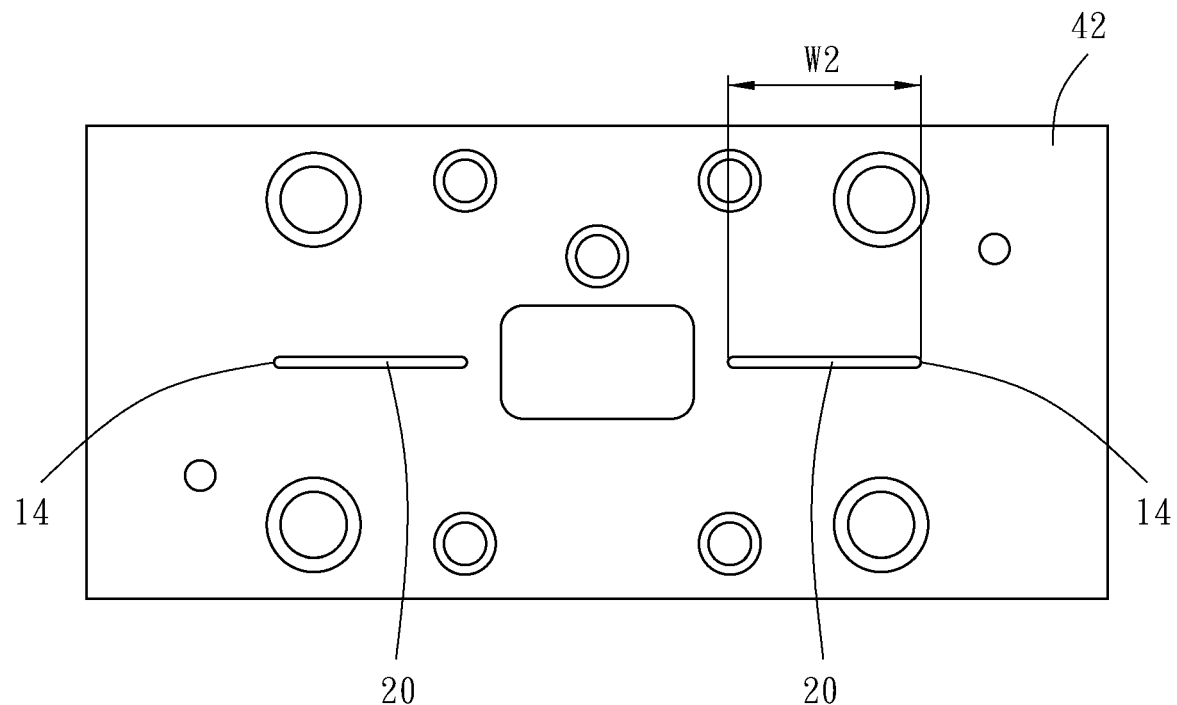
FIG. 16 is an end view of the sixth die block of the forming mold in accordance with the present invention.
Figure 17:
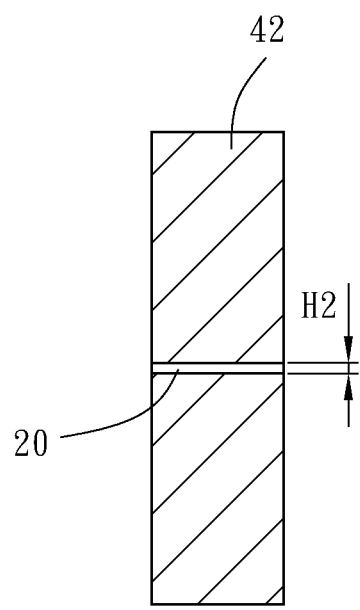
FIG. 17 is a sectional side view of the sixth die block of the forming mold in accordance with the present invention.

As shown in FIGS. 1 and 2, the two main flow passages 16 each have an outlet section 20, the outlet section 20 of each of the two main flow passages 16 has one end thereof connected to one respective outlet 14. The two outlet sections 20 have a rectangular cross-sectional shape. As shown in FIGS. 16 and 17, the height H2 of the two outlet sections 20 is consistent from beginning to end (the height H2 in this embodiment is 2.8 mm). The width W2 of the two outlet sections 20 is consistent from beginning to end (the width W2 in this embodiment is 51 mm). In addition, as shown in FIG. 15, the extending direction of the two outlet sections 20 is parallel to the central axis A.

As shown in FIG. 1 and FIG. 2, each main flow passage 16 has a front connection section 22, a middle connection section 24 and a rear connection section 26. One end of the front connection section 22 is connected to the inlet section 18, and the middle connection section 24 is connected between the front connection section 22 and the rear connection section 26. One end of the rear connection section 26 is connected to the outlet section 20.

Figure 6:
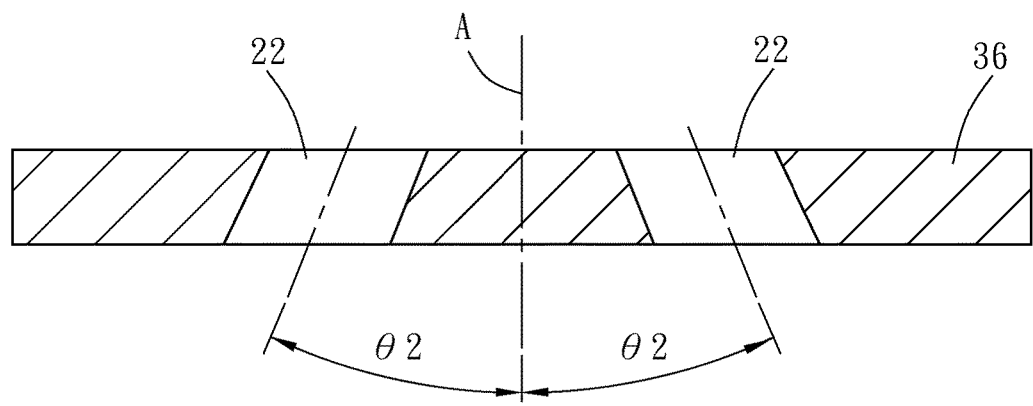
FIG. 6 is a top view of the third die block of the forming mold in accordance with the present invention.
Figure 7:
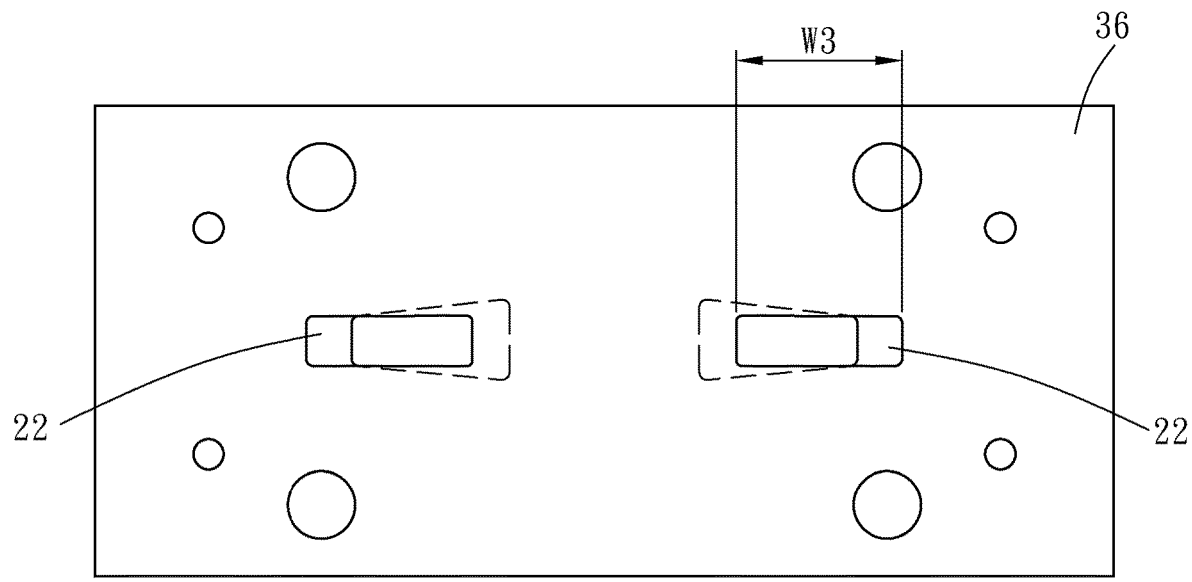
FIG. 7 is an end view of the third die block of the forming mold in accordance with the present invention.
Figure 8:
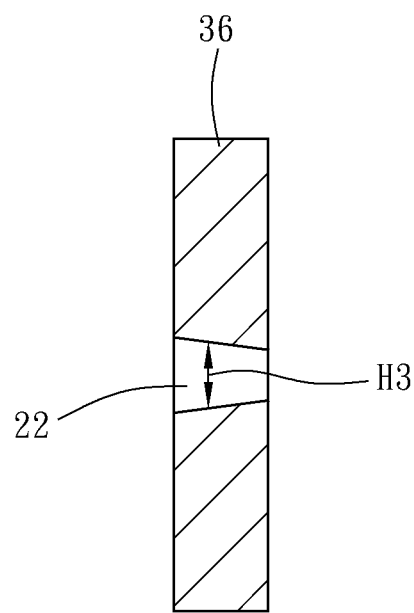
FIG. 8 is a sectional side view of the third die block of the forming mold in accordance with the present invention.

As shown in FIG. 7 and FIG. 8, the height H3 of the front connection section 22 gradually reduces from the inlet section 18 toward the middle connection section 24 (the height H3 in this embodiment gradually reduces from 19.99 mm to 13.4 mm), and the width W3 of the front connection section 22 is consistent from beginning to end (the width W3 in this embodiment is 44 mm). In addition, as shown in FIG. 6, a second included angle θ2 is respectively defined between the extension direction of each of the two front connection sections 22 and the central axis A. The sum of the angles of the two second included angles θ2 ranges from 36.9 to 61.9 degrees (the minimum total is 36.9 degrees, and the maximum total angle is 61.9 degrees).

Figure 9:
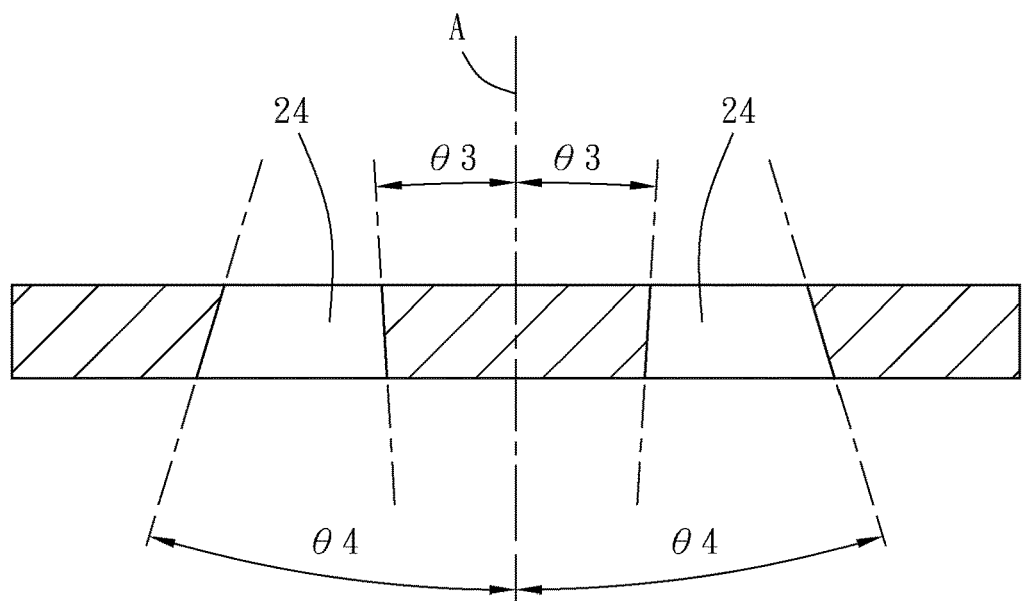
FIG. 9 is a top view of the fourth die block of the forming mold in accordance with the present invention.
Figure 10:
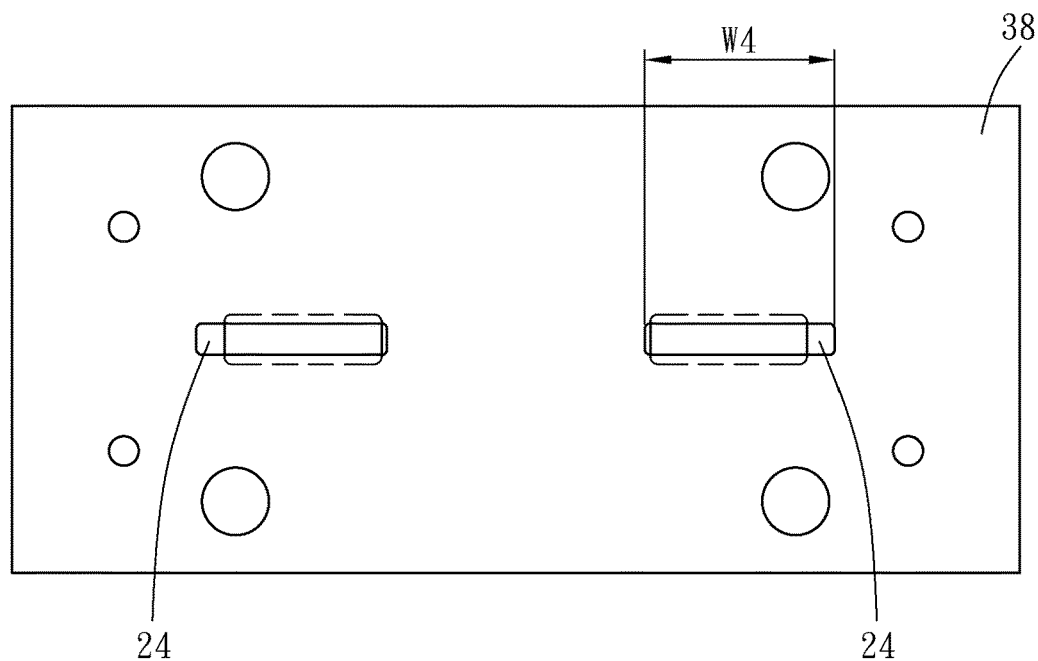
FIG. 10 is an end view of the fourth die block of the forming mold in accordance with the present invention.
Figure 11:
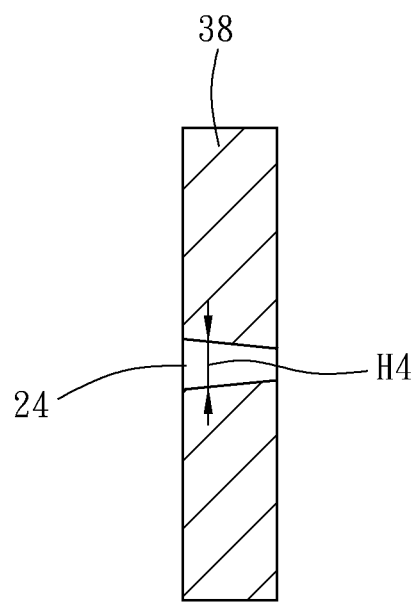
FIG. 11 is a sectional side view of the fourth die block of the forming mold in accordance with the present invention.

As shown in FIG. 10 and FIG. 11, the height H4 of the middle connection section 24 gradually reduces from the front connection section 22 toward the rear connection section 26 (the height H4 in this embodiment gradually reduces from 13.4 mm to 8.4 mm), and the width W4 of the middle connection section 24 gradually increases from the front connection section 22 toward the rear connection section 26 (the width W4 in this embodiment gradually increases from 44 mm to 51 mm). Furthermore, as shown in FIG. 9, a third included angle θ3 is respectively defined between the extension direction of the inner wall of each of the two middle connection sections 24 and the central axis A. The sum of the angles of the two third included angles θ3 ranges from 5.7 to 8.6 degrees (the minimum total is 5.6 degrees, and the maximum total angle is 8.6 degrees). A fourth included angle θ4 is respectively defined between the extension direction of the outer wall of each of the two middle connection sections 24 and the central axis A. The sum of the angles of the two fourth included angles θ4 ranges from 28.1 to 41.1 degrees (the minimum total is 28.1 degrees, and the maximum total is 41.1 degrees).

Figure 12:
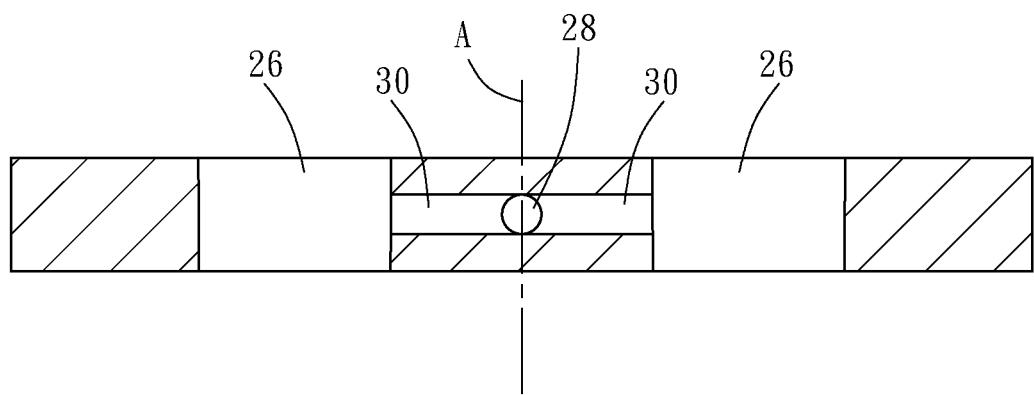
FIG. 12 is a top view of the fifth die block of the forming mold in accordance with the present invention.
Figure 13:
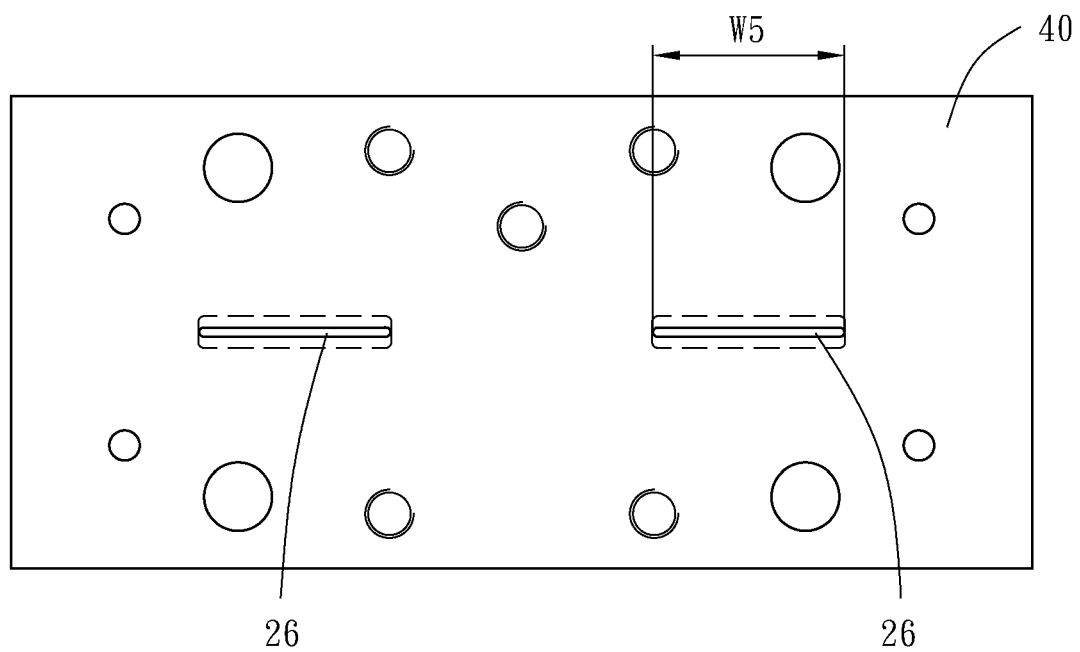
FIG. 13 is an end view of the fifth die block of the forming mold in accordance with the present invention.
Figure 14:
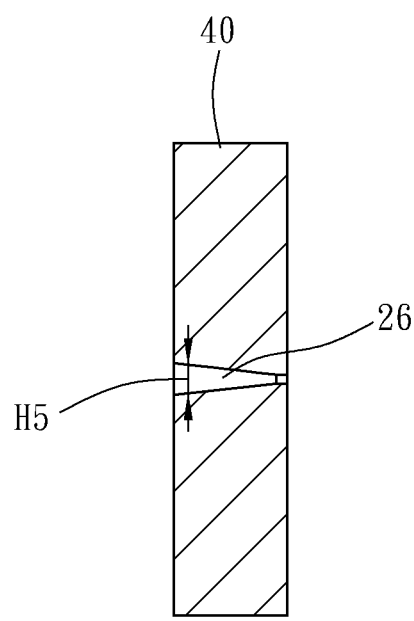
FIG. 14 is a sectional side view of the fifth die block of the forming mold in accordance with the present invention.

As shown in FIGS. 12-14, the height H5 of the two rear connection sections 26 respectively gradually reduces from the respective middle connection section 24 toward the respective outlet section 20 (the height H5 in this embodiment gradually reduces from 8.2 mm to 2.4 mm), and the width W5 of the rear connection section 25 gradually increases from the middle connection section 24 toward the outlet section 20 (the width W5 in this embodiment gradually increases from 50.6 mm to 51 mm).

On the other hand, as shown in FIG. 1, the forming mold 10 of the present invention is composed of six die blocks, which are, sequentially from front to back, the first die block 32, the second die block 34, the third die block 36, the fourth die block 38, the fifth die block 40, and the sixth die block 42. In terms of length, the length L1 of the first die block 32 is 70 mm, the length L2 of the second die block 34 is 25-35 mm, the length L3 of the third die block 36 is 20-30 mm, the length L4 of the fourth die block 38 is 20-30 mm, the length L5 of the fifth die block 40 is 25-30 mm, and the length L6 of the sixth die block 42 is 30-40 mm. In addition to the configuration of the main flow passages 16, the inlet 12 is located at first die block 32, the inlet sections 18 are located at the first die block 32 and the second die block 34, the front connection sections 22 are located at the third die block 36, the middle connection sections 24 are located at the fourth die block 38, the rear connection sections 26 are located at the fifth die block 40, and the outlet sections 20 are located at the sixth die block 42.

In addition, as shown in FIG. 1 and FIG. 2, the forming mold 10 of the present invention further has a sub flow passage 28 and two branch flow passages 30. The sub flow passage 28 is located between the rear connection sections 26 of the two main flow passages 16 and extends straight down from the top surface of the fifth die block 40. One end of the two branch flow passages 30 communicates with the bottom end of the sub flow passage 28, and the other end of the two branch flow passages 30 communicates with the rear connection sections 26 of the two main flow passages 16 in a one-to-one manner.

In use, the polyvinyl chloride foam material with a specific gravity of 1.550-1.750 and high foaming characteristics is injected into the inlet 12, and then the polyvinyl chloride foam material flows from the inlet 12 to the two main flow passages 16. Then, in the process of flowing through two main flow passages 16, on the one hand, by the change in height of the two main flow passages 16 and on the other hand, by the change in width and angle of the two main flow passages 16, the polyvinyl chloride foam material is gradually squeezed, and the product shape is formed when the polyvinyl chloride foam material is finally discharged by two outlets 14. As for the size of the product is 63.5 mm±0.2 mm (width)×2.8 mm±0.1 mm (thickness), the weight is 28 g±1 g per inch, and the surface hardness is more than 85A Shore. In addition, in the process of the polyvinyl chloride foam material flowing through the two main flow passages 16, a skin material (such as PVC, ABS, ASA, etc.) with a specific gravity of 1.450 to 1.650 and high strength and low foaming characteristics is injected into the sub flow passage 28, so that the skin material flows from the sub flow passage 28 through the two branch flow passages 30 to the rear connection sections 26 of the two main flow passages 16 respectively, and the skin material is then mixed with the polyvinyl chloride foam material passing therethrough to form the skin layer of the product.

In conclusion, the forming mold 10 of the present invention uses a one-in two-out design and is matched with the symmetrical configuration and special angle design of the two main flow passages 16 to allow the PVC foam material to pass through quickly and stably so as to form the shape of the product and make the manufactured product have the characteristics of light weight, good hardness, strong rigidity and stable quality.

What is claimed is:

1. A forming mold for making polyvinyl chloride foamed wood-like slats, comprising an inlet, two outlets and two main flow passages, said two main flow passages being symmetrically arranged with respect to a central axis, said two main flow passages each comprising an inlet section and an outlet section, said inlet sections of said two main flow passages each having one end thereof commonly connected to said inlet, an extension direction of said inlet section of each of said two main flow passages respectively defining with said central axis a first included angle therebetween, a sum of the angles of the two said first included angles ranging from 44.2 to 48.8 degrees, said outlet section of each of said two main flow passage having one end thereof connected to one respective said outlet, a width of said two main flow passages gradually increasing from said inlet toward said outlets, a height of said two main flow passages gradually reducing from said inlet toward said outlets;

wherein said two main flow passages each comprise a front connection section, a middle connection section and a rear connection section, said front connection section having one end thereof connected to the associating said inlet section, said middle connection section being connected between said front connection section and said rear connection section, said rear connection section having one end thereof connected to the associating said outlet section;

wherein the width of said middle connection section of each of said two main flow passages gradually increases from the associating said front connection section toward the associating said rear connection section;

wherein a third included angle is respectively defined between the extension direction of an inner wall of each of said two middle connection sections and said central axis, and the sum of the angles of said two third included angles ranges from 5.7 to 8.6 degrees; a fourth included angle is respectively defined between the extension direction of an opposing outer wall of each of said two middle connection sections and said central axis, and the sum of the angles of said two fourth included angles ranges from 28.1 to 41.1 degrees.

2. The forming mold for making polyvinyl chloride foamed wood-like slats as claimed in claim 1, wherein the width of said inlet section of each of said two main flow passages is consistent from beginning to end.

3. The forming mold for making polyvinyl chloride foamed wood-like slats as claimed in claim 1, wherein the height of said inlet section of each of said two main flow passages is consistent from beginning to end.

4. The forming mold for making polyvinyl chloride foamed wood-like slats as claimed in claim 1, wherein the width of said outlet section of each of said two main flow passages is consistent from beginning to end, and the extending direction of said outlet section of each of said two main flow passages is parallel to said central axis.

5. The forming mold for making polyvinyl chloride foamed wood-like slats as claimed in claim 1, wherein the height of said outlet section of each of said two main flow passages is consistent from beginning to end.

6. The forming mold for making polyvinyl chloride foamed wood-like slats as claimed in claim 1, wherein the width of said front connection section of each of said two main flow passages gradually increases from the associating said inlet section toward the associating said middle connection section.

7. The forming mold for making polyvinyl chloride foamed wood-like slats as claimed in claim 6, wherein the extension direction of each of said two front connection sections respectively defines with said central axis a second included angle therebetween, and the sum of the angles of said two second included angles ranges from 36.9 to 61.9 degrees.

8. The forming mold for making polyvinyl chloride foamed wood-like slats as claimed in claim 1, wherein the height of said front connection section of each of said two main flow passages gradually reduces from the associating said inlet section to the associating said middle connection section.

9. The forming mold for making polyvinyl chloride foamed wood-like slats as claimed in claim 1, wherein the height of said middle connection section of each of said two main flow passages gradually reduces from the associating said front connection section to the associating said rear connection section.

10. The forming mold for making polyvinyl chloride foamed wood-like slats as claimed in claim 1, wherein the width of said rear connection section of each of said two main flow passages gradually increases from the associating said middle connection section toward the associating said outlet section.

11. The forming mold for making polyvinyl chloride foamed wood-like slats as claimed in claim 1, wherein the height of said rear connection section of each of said two main flow passages gradually reduces from the associating said middle connection section to the associating said outlet section.

12. The forming mold for making polyvinyl chloride foamed wood-like slats as claimed in claim 1, further comprising a sub flow passage and two branch flow passages, said sub flow passage being located between said rear connection sections of said two main flow passages and extending straight down from a top surface of said forming mold, said two branch flow passages each having one end thereof respectively communicating with said rear connection sections of said two main flow passages and an opposite end thereof commonly communicating with a bottom end of said sub flow passage.

13. The forming mold for making polyvinyl chloride foamed wood-like slats as claimed in claim 12, wherein said inlet is located at a first die block of said forming mold, said inlet sections are located at said first die block and a second die block of said forming mold that is connected to said first die block, said front connection sections are located at a third die block of said forming mold that is connected to said second die block, said middle connection sections are located at a fourth die block of said forming mold that is connected to said third die block, said rear connection sections, said sub flow passage and said branch flow passages are located at a fifth die block of said forming mold that is connected to said fourth die block, and said outlet sections are located at a sixth die block of said forming mold that is connected to said fifth die block.

14. The forming mold for making polyvinyl chloride foamed wood-like slats as claimed in claim 1, wherein said inlet is located at a first die block of said forming mold, said inlet sections are located at said first die block and a second die block of said forming mold that is connected to said first die block, said front connection sections are located at a third die block of said forming mold that is connected to said second die block, said middle connection sections are located at a fourth die block of said forming mold that is connected to said third die block, said rear connection sections are located at a fifth die block of said forming mold that is connected to said fourth die block, and said outlet sections are located at a sixth die block of said forming mold that is connected to said fifth die block.

* * * * *